(12) United States Patent
Damm et al.

(10) Patent No.: US 10,520,044 B2
(45) Date of Patent: Dec. 31, 2019

(54) METHOD OF PRODUCING A SLIDING SLEEVE FOR A SYNCHRONOUS MANUAL TRANSMISSION ASSEMBLY AND SLIDING SLEEVE PRODUCED BY MEANS OF THE METHOD

(71) Applicant: HOERBIGER ANTRIEBSTECHNIK HOLDING GMBH, Schongau (DE)

(72) Inventors: Ansgar Damm, Kinsau (DE); Georg Holzheu, Hohenfurch (DE); Stefan Kleiner, Burggen (DE); Bjoern Lauer, Ingenried (DE); Hermann Thau, Grossbottwar (DE)

(73) Assignee: HOERBIGER ANTRIEBSTECHNIK HOLDING GMBH (DE)

(*) Notice: Subject to any disclaimer, the term of this patent is extended or adjusted under 35 U.S.C. 154(b) by 144 days.

(21) Appl. No.: 15/491,782

(22) Filed: Apr. 19, 2017

(65) Prior Publication Data
US 2017/0298997 A1    Oct. 19, 2017

(30) Foreign Application Priority Data

Apr. 19, 2016 (DE) .................. 10 2016 107 240

(51) Int. Cl.
| | |
|---|---|
| *F16D 23/06* | (2006.01) |
| *B21B 21/00* | (2006.01) |
| *B21B 25/00* | (2006.01) |

(52) U.S. Cl.
CPC ............. *F16D 23/06* (2013.01); *B21B 21/00* (2013.01); *B21B 25/00* (2013.01); *F16D 2023/0631* (2013.01); *F16D 2023/0656* (2013.01); *F16D 2200/0021* (2013.01); *F16D 2250/0023* (2013.01); *F16D 2250/0038* (2013.01); *Y10T 29/49798* (2015.01)

(58) Field of Classification Search
CPC ......... Y10T 29/49467; Y10T 29/49471; Y10T 29/49474; Y10T 29/49478; Y10T 29/49789; Y10T 29/4979; Y10T 29/49792; Y10T 29/49794; Y10T 29/49798

See application file for complete search history.

(56) References Cited

U.S. PATENT DOCUMENTS

| 1,650,852 | A | * | 11/1927 | Rouanet | ................ | F16C 33/427 |
|---|---|---|---|---|---|---|
| | | | | | | 29/417 |
| 3,028,662 | A | * | 4/1962 | Pessl | ................ | B21K 1/30 |
| | | | | | | 29/893.3 |
| 3,206,830 | A | * | 9/1965 | Hart | ................ | B21K 1/06 |
| | | | | | | 29/417 |
| 3,281,925 | A | * | 11/1966 | Edward | ................ | B21H 5/02 |
| | | | | | | 29/893.34 |

(Continued)

FOREIGN PATENT DOCUMENTS

| DE | 3642769 C1 * | 7/1987 | ............. | B21B 17/04 |
|---|---|---|---|---|
| EP | 1457273 A2 * | 9/2004 | ............. | B21B 21/005 |

(Continued)

*Primary Examiner* — Jason L Vaughan
(74) *Attorney, Agent, or Firm* — Hayes Soloway P.C.

(57) ABSTRACT

A sliding sleeve for a synchronous manual transmission assembly is produced by the following steps:
a tubular blank is provided in which an internal toothing arrangement is present, and
the blank which is provided with the internal toothing arrangement is further processed to form a plurality of sliding sleeves.

18 Claims, 5 Drawing Sheets

(56) References Cited

U.S. PATENT DOCUMENTS

| | | | | |
|---|---|---|---|---|
| 3,365,775 A | * | 1/1968 | Cavagnero | B21D 53/12 219/105 |
| 3,470,775 A | * | 10/1969 | Marcovitch | B21B 1/16 29/417 |
| 3,695,076 A | * | 10/1972 | Kocks | B21B 19/06 72/209 |
| 3,711,915 A | * | 1/1973 | Maxon, Jr. | B23K 7/00 29/893.3 |
| 3,879,897 A | * | 4/1975 | Kato | B24B 5/12 29/417 |
| 3,927,450 A | * | 12/1975 | Sommer | B23P 15/003 29/417 |
| 4,030,179 A | * | 6/1977 | Schwarz | B23P 13/04 29/888.092 |
| 4,360,959 A | * | 11/1982 | Johannesen | B21D 53/34 188/250 C |
| 4,470,282 A | * | 9/1984 | Hayashi | B21B 19/04 72/97 |
| 4,562,713 A | * | 1/1986 | Kondoh | B21B 21/005 414/431 |
| 4,612,789 A | * | 9/1986 | Andriessen | B21H 1/12 29/417 |
| 4,966,022 A | * | 10/1990 | Stinnertz | B21B 25/04 72/208 |
| 4,995,252 A | * | 2/1991 | Robertson | B21B 17/08 72/194 |
| 5,392,517 A | * | 2/1995 | Lyon | B21H 1/06 29/893.36 |
| 5,711,074 A | * | 1/1998 | Harimoto | B23D 31/003 29/417 |
| 6,205,833 B1 | * | 3/2001 | Kalkenings | B21B 25/00 72/208 |
| 6,631,542 B1 | * | 10/2003 | Imai | B23P 15/00 148/228 |
| 6,883,358 B2 | * | 4/2005 | Hauf | B21H 5/02 29/893.32 |
| 7,201,812 B2 | * | 4/2007 | Ogawa | B21B 21/00 148/592 |
| 8,230,597 B2 | * | 7/2012 | Szuba | B21D 22/16 29/417 |
| 2002/0000031 A1 | * | 1/2002 | Rosasco | B21C 37/0807 29/413 |
| 2003/0196734 A1 | * | 10/2003 | Ogawa | B21B 21/00 148/590 |
| 2007/0164249 A1 | * | 7/2007 | Willers | B21C 23/142 251/366 |
| 2010/0083783 A1 | * | 4/2010 | Szuba | B21D 22/16 74/468 |

FOREIGN PATENT DOCUMENTS

| | | | | |
|---|---|---|---|---|
| JP | 60166108 A | * | 8/1985 | B21B 21/005 |
| SU | 478630 A | * | 2/1976 | B21B 25/00 |
| SU | 505457 A | * | 7/1977 | B21B 17/04 |

* cited by examiner

METHOD OF PRODUCING A SLIDING SLEEVE FOR A SYNCHRONOUS MANUAL TRANSMISSION ASSEMBLY AND SLIDING SLEEVE PRODUCED BY MEANS OF THE METHOD

The invention relates to a method of producing a sliding sleeve for a synchronous manual transmission assembly and to a sliding sleeve produced by such a method.

BACKGROUND OF THE INVENTION

A synchronous manual transmission assembly serves to couple loose wheels of transmission stages ("gears") of a manual transmission comprising a transmission shaft when the appropriate gear is to be selected. An example of such a synchronous assembly is shown schematically in FIG. 1.

The synchronous assembly contains a synchroniser hub 10 which is arranged on a transmission shaft for conjoint rotation therewith. Arranged on the synchroniser hub is a sliding sleeve 12 which can be displaced relative to the synchroniser hub 10 in the axial direction but is fixed for conjoint rotation therewith in the circumferential direction. For this purpose, the sliding sleeve 12 is provided with an internal toothing arrangement 14 which can be displaced axially but in the circumferential direction engages into an external toothing arrangement 16 of the synchroniser hub 10 for conjoint rotation therewith.

The synchronous assembly also includes two coupling rings 18, 20 which are each connected to a loose wheel 11 of the manual transmission for conjoint rotation therewith. Each coupling ring 18, 20 is provided on its outer circumference with a coupling toothing arrangement 22 on to which the sliding sleeve 12 with its the internal toothing arrangement 14 can be slid.

In order to select a gear of the manual transmission, the loose wheel of the transmission gearwheels which is associated with this gear is coupled to the transmission shaft for conjoint rotation therewith. For this purpose, the sliding sleeve 12 is displaced in the axial direction on the synchroniser hub 10. For this purpose, a shift fork can be used which engages into a suitable outer contour of the sliding sleeve 12. In the illustrated exemplified embodiment, the outer contour 13 is a groove.

In order to connect e.g. the gearwheel allocated to the coupling ring 18 to the transmission shaft for conjoint rotation therewith, the sliding sleeve 12 in FIG. 1 is displaced to the left until it engages with its internal toothing arrangement 14 into the coupling toothing arrangement 22. In this state, the gearwheel is connected to the transmission shaft via the coupling ring 18, the coupling toothing arrangement 22, the internal toothing arrangement 14 of the sliding sleeve 12, the external toothing arrangement 16 of the synchroniser hub 10 and finally the synchroniser hub itself.

The shifting procedure and in particular the matching of the rotational speeds of the synchroniser hub 10 and of the corresponding gearwheel (the "synchronisation") involve a number of further components which are not necessary for understanding the invention described in this case, e.g. synchroniser rings 24 and pressure pieces 26.

It is known from the prior art to produce the sliding sleeve 12 in an individual manner in a machining method. This gives rise to comparatively high costs.

The object of the invention is to provide a sliding sleeve in a cost-effective manner without causing any losses in terms of quality.

BRIEF DESCRIPTION OF THE INVENTION

In accordance with the invention, in order to achieve this object a method of producing a sliding sleeve for a synchronous manual transmission assembly is provided, wherein the following steps are used: firstly, a tubular blank is provided in which an internal toothing arrangement is present. Then, the blank which is provided with the internal toothing arrangement is further processed to form a plurality of sliding sleeves. In order to achieve the aforementioned object, a sliding sleeve is also provided which is produced according to such a method.

The invention is based on the basic idea of no longer producing the internal toothing arrangement individually on each sliding sleeve but instead providing a broader blank having an internal toothing arrangement and then producing a plurality of sliding sleeves therefrom. Since the production of an internal toothing arrangement is very complex, cost advantages are achieved if the internal toothing arrangement can be produced for a plurality of sliding sleeves in one operation.

Preferably, provision is made that the internal toothing arrangement is produced by means of plastic deformation of the blank. Apart from the fact that material usage is hereby reduced in comparison with a machining method, the stability of the sliding sleeve is increased by reason of the cold work hardening of the material during deformation.

According to one embodiment of the invention, provision is made that the internal toothing is produced by means of a pilgering method, in particular a cold pilgering method. This method is very suitable for producing the toothing arrangement with a small amount of outlay and a high level of precision.

During pilgering, a pilger mandrel is preferably used which has different pitches. This renders it possible to produce the different tooth shapes of the blank and thus also of the sliding sleeve with the same mandrel.

The internal toothing arrangement preferably has teeth which are associated with different toothing arrangements. The toothing arrangements differ by reason of a specific function on the sliding sleeve, e.g. slight insertion into the coupling toothing arrangement, reliable guidance which prevents tipping on the synchroniser hub or a limit to the maximum shifting travel. All of these toothing arrangements can be formed on the blank with little effort. The teeth of the different toothing arrangements differ in terms of their tooth width, their tooth height, their modulus and/or the tooth profile. Furthermore, individual teeth can also be missing or two teeth can be combined into one.

According to one embodiment of the invention, after the internal toothing arrangement is introduced the blank is subdivided into individual segments which are provided with an outer contour. According to an alternative embodiment, provision is made that after the internal toothing arrangement is introduced the blank is provided with an outer contour in sections and is then subdivided into individual segments. These two variants can be used in dependence upon the respectively subsequent processing steps.

In order to subdivide the blank into the individual segments, provision can be made that the segments are cut off from the blank. However, other methods are essentially also feasible, e.g. laser cutting.

The outer contour can be introduced by means of a machining procedure. This is particularly recommended if the outer contour is a groove.

The outer contour can also be introduced by means of plastic deformation. As a result, it is possible to produce both a groove on the outer circumference of the sliding sleeve and also a ring which protrudes in the radial direction.

Alternatively, the outer contour can also be produced by attaching at least one component. For example, a ring can be welded, soldered or shrink-fitted or a plurality of lugs arranged on the same circumference can be attached which together define a contour which can be engaged by a shift fork or shift ring.

A part of the further processing of the segments into sliding sleeves can also be to sharpen or undercut the internal toothing, i.e. the ends of the toothing arrangement of the sliding sleeve on the outside in the axial direction are post-processed with regard to different desired functions (e.g. slight engagement into the coupling toothing arrangement or axial locking in the shifted state).

Provision can also be made that the sliding sleeve is thermally treated, in particular is hardened. As a result, a high level of hardness and thus a high level of wear resistance can be achieved either over the entire surface of the sliding sleeve or even only in the regions subjected to particular loading in each case (e.g. the internal toothing arrangement).

BRIEF DESCRIPTION OF THE DRAWINGS

The invention will be described hereinafter with reference to an embodiment which is illustrated in the accompanying drawings, in which.

DETAILED DESCRIPTION OF THE INVENTION

Figure 1:
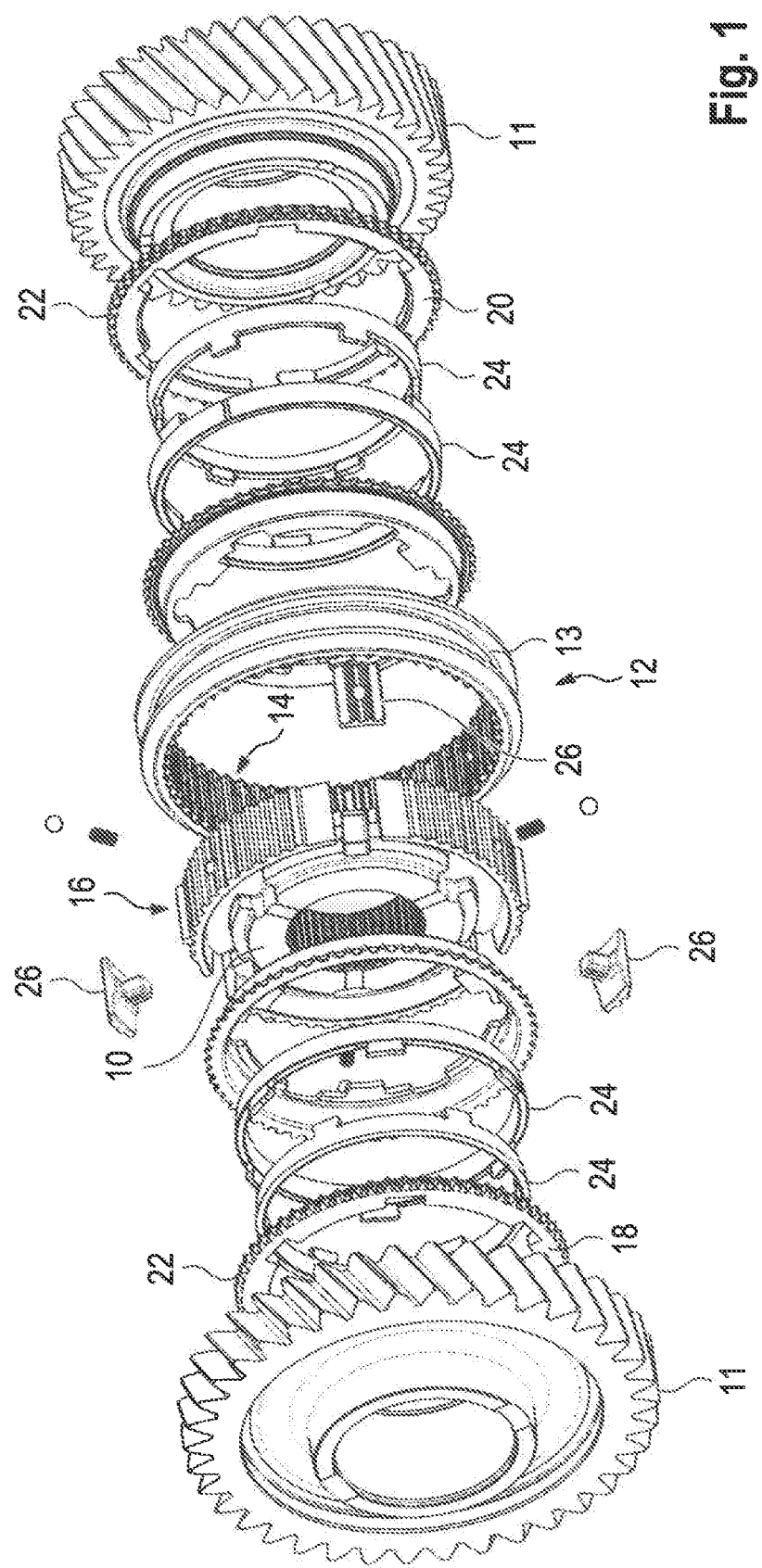
FIG. 1 schematically shows a synchronous manual transmission assembly comprising a sliding sleeve.
Figure 2:
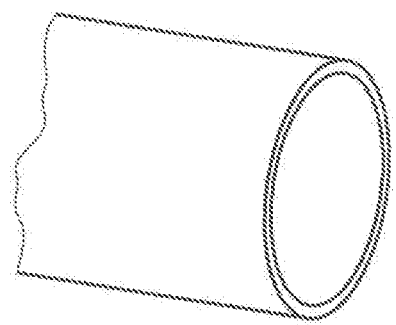
FIG. 2 schematically shows a first step of a method in accordance with the invention.
Figure 3:
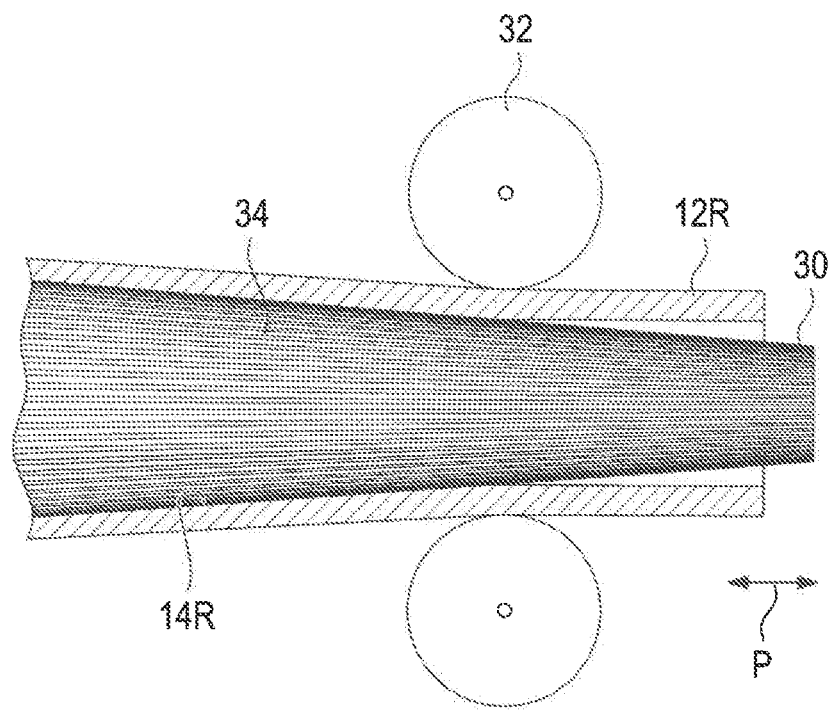
FIG. 3 schematically shows a second step of a method in accordance with the invention.

The production of a sliding sleeve 12, as can be used in a synchronous manual transmission assembly shown in FIG. 1, will be explained hereinafter with reference to FIGS. 2 to 9.

In a first step, a blank 12R is provided which is a tube consisting of a metal alloy, in particular case-hardened steel or carbon steel. The tube is seamless. If the blank 12R is a tube comprising a smooth inner surface or is a tube whose inner profiling does not correspond to the internal toothing arrangement of the sliding sleeve to be produced, the blank 12R is provided with an internal toothing arrangement 14R in a second method step. For this purpose, the blank 12R is plastically deformed.

The blank 12R is dimensioned in such a manner that after the subsequent further processing steps the sliding sleeve is produced with the desired dimensions.

In one embodiment (see FIG. 3), the second method step consists of cold-pilgering the blank 12R. For this purpose, a pilger mandrel 30 and a plurality of schematically illustrated rollers 32 are used. The pilger mandrel is provided on its outer circumferential surface with a toothing arrangement 34 which has different pitches corresponding to the toothing arrangement to be produced.

By repeatedly moving the blank 12R with the pilger mandrel 30 in a reciprocating manner between the rollers 32 and by suitably advancing the rollers 32, the blank 12R is deformed such that it has on its inner surface a continuous internal toothing arrangement 14R (possibly apart from the beginning and end portions of the blank 12R).

Figure 4:
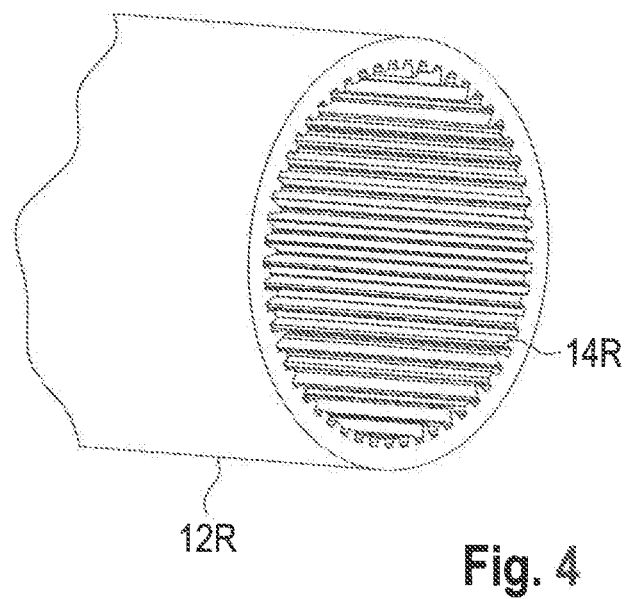
FIG. 4 shows a perspective truncated view of a blank after completion of the second method step.

FIG. 4 shows the blank 12R after completion of the second method step. The continuous toothing arrangement 14R on the inner side can be clearly seen.

Figure 5:
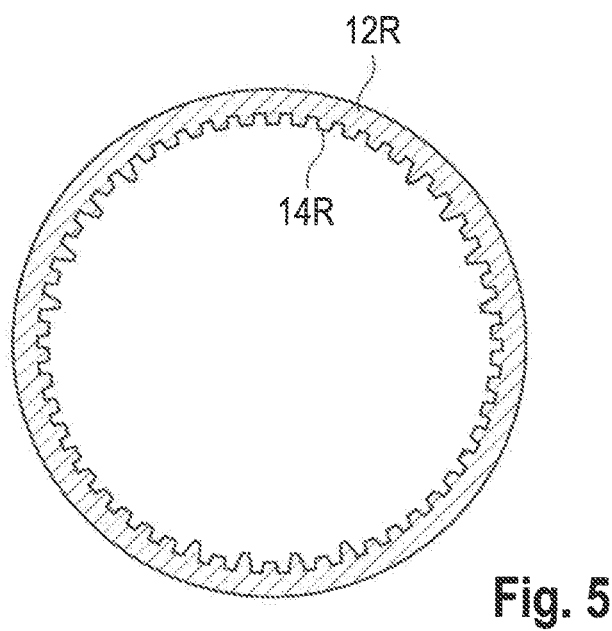
FIG. 5 shows a sectional view of the blank of FIG. 4.
Figure 6:
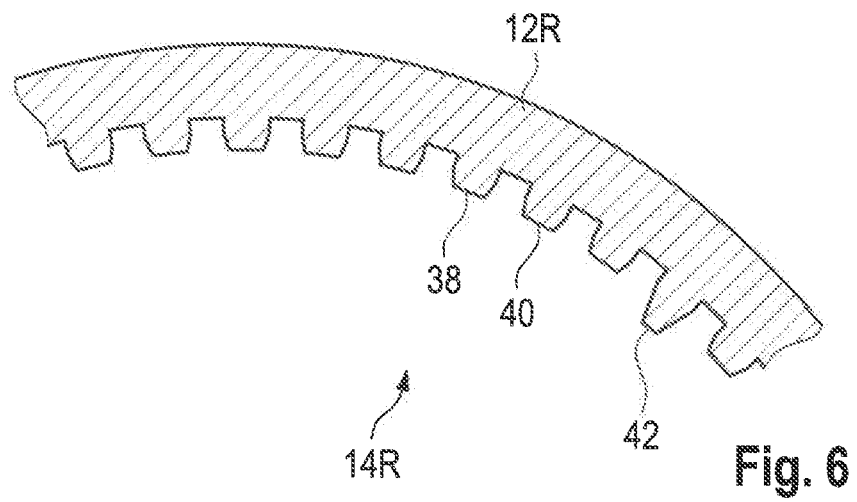
FIG. 6 shows an enlarged view of a detail of a section of FIG. 5.

As is apparent in particular from FIGS. 5 and 6, the internal toothing arrangement 14R has different toothing arrangements, i.e. a repeating pattern of teeth which differ in terms of their tooth width, their tooth height, their modulus and/or their tooth profile. By way of example, reference is made in this case to the teeth 38, 40, 42, wherein the teeth 38, 40 differ in terms of the tooth width and also their profile and the teeth 38, 40 differ with respect to the tooth 42 in terms of the tooth height.

Figure 7:
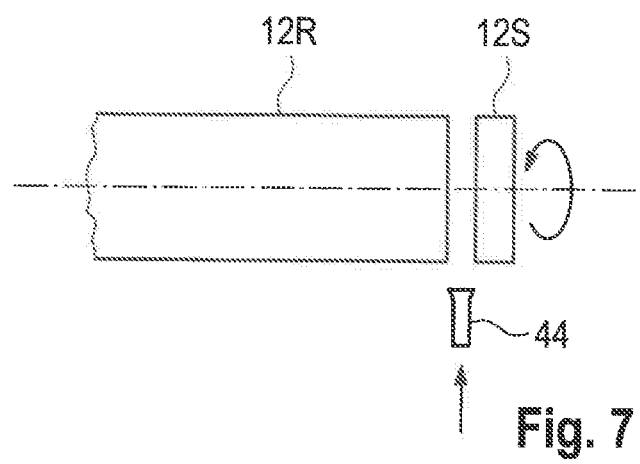
FIG. 7 schematically shows a third method step.

FIG. 7 schematically illustrates how the blank 12R, after being provided with the internal toothing 14R, is subdivided into individual sliding sleeve segments 12S. In the illustrated exemplified embodiment, the segments 12S are cut off using a turning tool 44.

Figure 8:
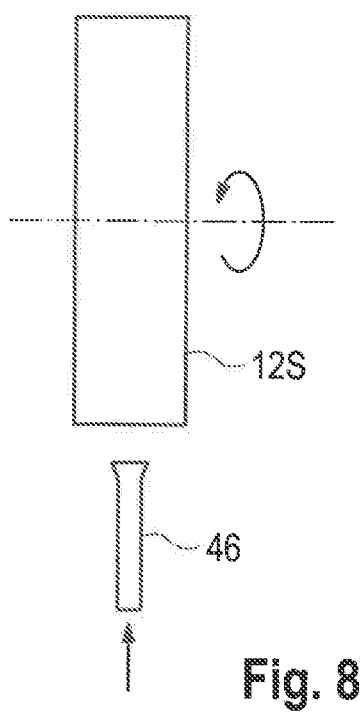
FIG. 8 schematically shows a further processing step.

FIG. 8 schematically shows a step for further processing a cut-off segment 12S. The further processing step consists in this case of producing an outer contour which subsequently can be engaged by a component with which the sliding sleeve 12 can be displaced in the axial direction for the purpose of gear-shifting. In the example of FIG. 8, the outer contour is machined to form the outer circumference using a turning tool 46.

The further processing can also consist of the segment 12S being plastically deformed on its outer side such that a suitable outer contour is produced. For example, a groove can be rolled in. It is also possible to deform the material such that it curves radially outwards in specific regions.

The further processing can also consist of a separate component (e.g. a ring) or a plurality of separate components (e.g. a plurality of lugs) being attached, e.g. welded, soldered or shrink-fitted on the outer surface of the segment 12S. As a result, an outer contour can also be produced which can be engaged by e.g. a shift fork.

Alternatively, the desired outer contour can also be produced at suitable locations on the blank 12R before the blank is subdivided into the individual segments 12S.

Further processing steps consist of the internal toothing 14 being post-processed. For example, it can be sharpened at the axial ends or can also be undercut in the vicinity of the axial ends.

The post-processing of the internal toothing arrangement can also consist of providing the apertures 29 for the mid-centring 28.

Further processing steps can consist of thermally treating, in particularly hardening, the sliding sleeve.

Figure 9:
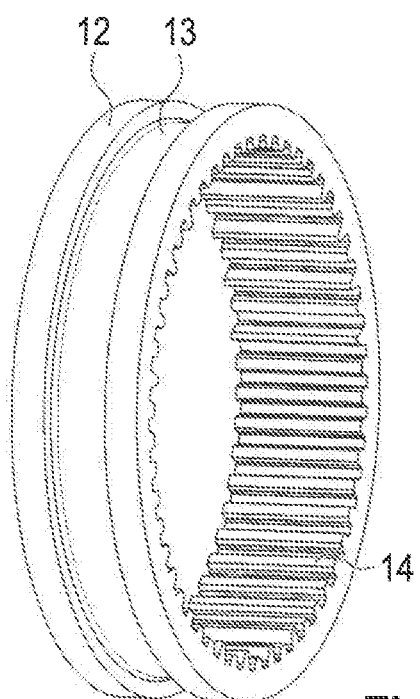
FIG. 9 shows a schematic, perspective view of a completed sliding sleeve.

FIG. 9 shows a completed sliding sleeve 12 which, on its outer circumference, is provided with the outer contour in the form of a groove 13.

The invention claimed is:

1. A method of producing a sliding sleeve for a synchronous manual transmission assembly comprising the following steps:

providing a tubular blank having a preformed internal toothing arrangement wherein the internal toothing arrangement is produced by cold pilgering rolling plastic deformation of the blank;

further processing the blank to form a plurality of sliding sleeves; and wherein a pilger mandrel having different toothing pitches is utilized in the preforming of the internal toothing arrangement.

2. The method of claim 1 wherein the blank is formed of a metal alloy.

3. The method of claim 2 wherein the blank is formed of a case-hardened steel or a carbon steel.

4. The method of claim 1 wherein, after the internal toothing arrangement is introduced, the blank is subdivided into individual segments which are provided with an outer contour.

5. The method of claim 4 wherein the segments are cut-off from the blank.

6. The method of claim 4 wherein the outer contour is introduced by a machining procedure.

7. The method of claim 4 wherein the outer contour is introduced by plastic deformation.

8. The method of claim 4 wherein the outer contour is produced by attaching at least one component.

9. The method of claim 4 wherein the internal toothing arrangement is sharpened.

10. The method of claim 4 wherein the internal toothing arrangement is undercut.

11. The method of claim 4 wherein the sliding sleeve is thermally treated.

12. The method of claim 1 wherein the blank has an outer contour subdivided into individual segments introduced by a machining procedure.

13. The method of claim 1 wherein the blank has an outer contour subdivided into individual segments introduced by plastic deformation.

14. The method of claim 1 wherein the blank has an outer contour subdivided into individual segments produced by attaching at least one component.

15. A method of producing a sliding sleeve for a synchronous manual transmission assembly comprising the steps of:

providing a tubular blank having a preformed internal toothing arrangement having teeth which are associated with different toothing arrangements, and further processing the blank to form a plurality of sliding sleeves;

wherein the teeth of the different toothing arrangements differ in terms of tooth width, tooth height, modulus, or tooth profile.

16. The method of claim 15 wherein the blank has an outer contour subdivided into individual segments introduced by a machining procedure.

17. The method of claim 15 wherein the blank has an outer contour subdivided into individual segments introduced by plastic deformation.

18. A method of producing a sliding sleeve for a synchronous manual transmission assembly comprising the steps in sequence of:

providing a tubular blank having a preformed internal toothing arrangement produced by cold pilgering, after the internal toothing arrangement is introduced, providing the blank with an outer contour in sections, and then subdividing the blank into individual segment; and wherein the outer contour is produced by attaching at least one component.

* * * * *

UNITED STATES PATENT AND TRADEMARK OFFICE
CERTIFICATE OF CORRECTION

PATENT NO. : 10,520,044 B2
APPLICATION NO. : 15/491782
DATED : December 31, 2019
INVENTOR(S) : Ansgar Damm et al.

Page 1 of 1

It is certified that error appears in the above-identified patent and that said Letters Patent is hereby corrected as shown below:

In the Claims

Claim 18, Column 6, Line 30 "subdiving" should be --subdividing--

Signed and Sealed this
Third Day of March, 2020

Andrei Iancu
*Director of the United States Patent and Trademark Office*